UNITED STATES PATENT OFFICE.

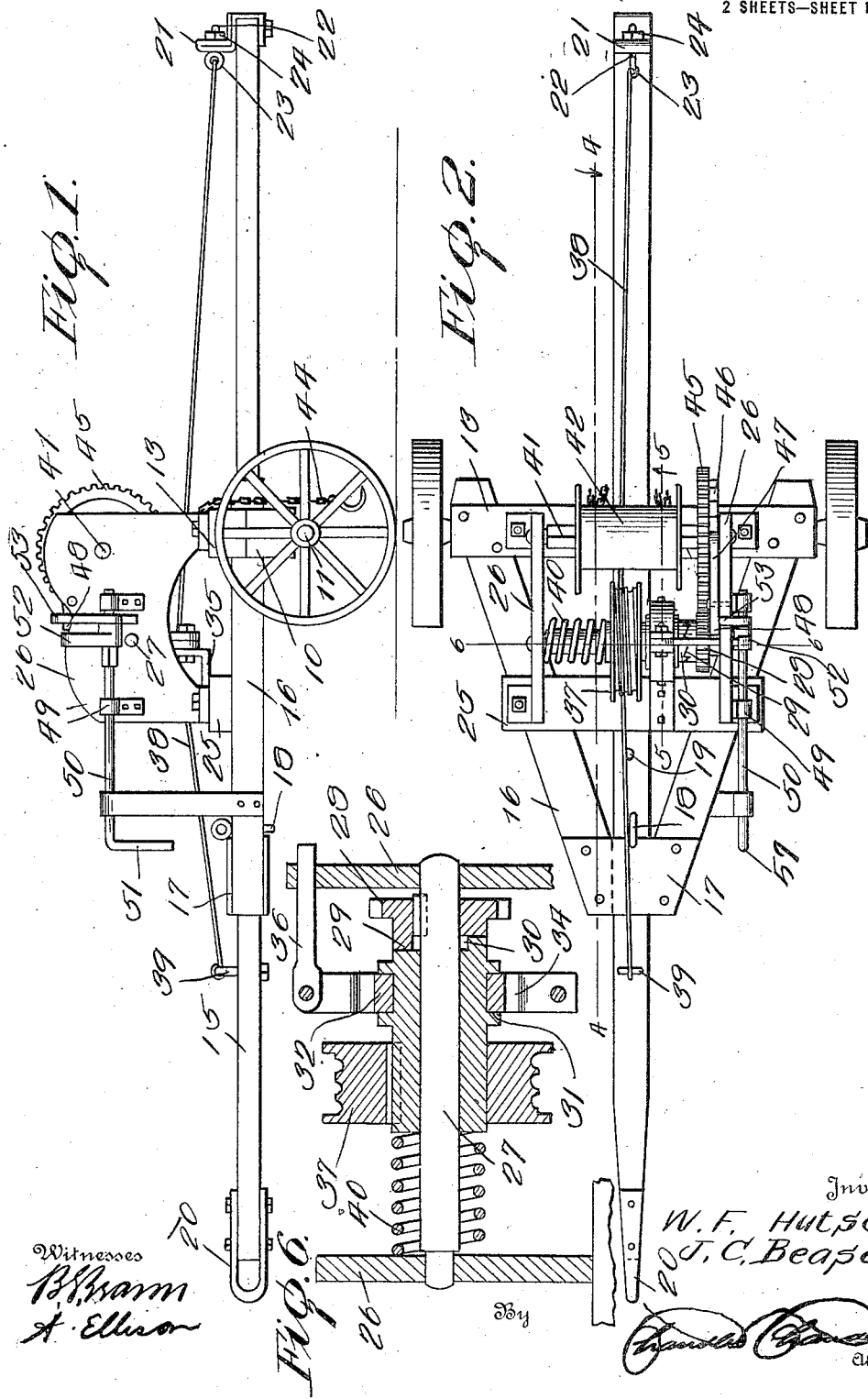

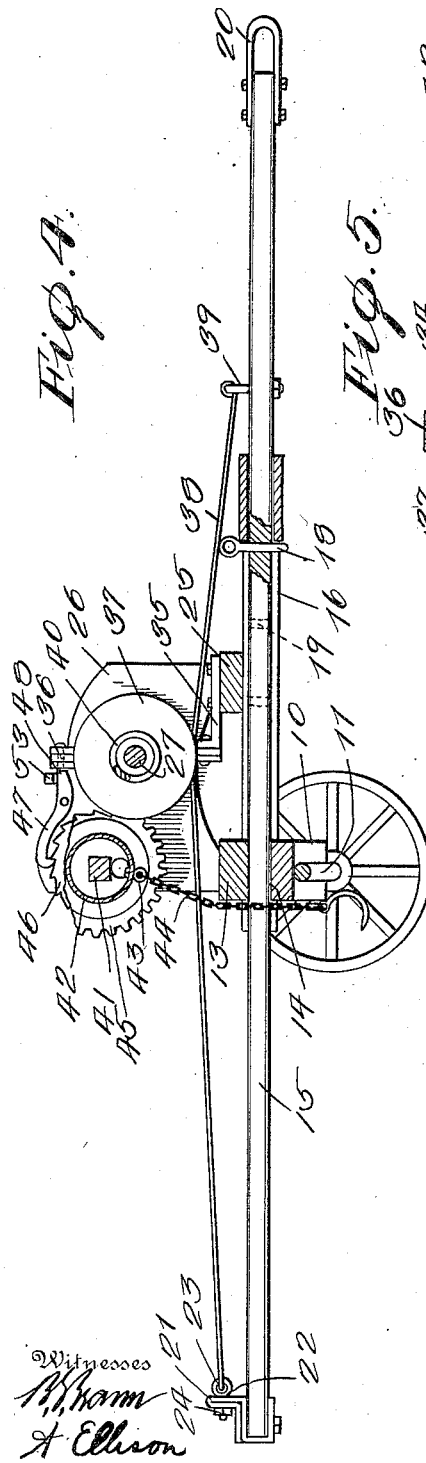

WILLIAM F. HUTSON, OF BARTO, AND JAMES C. BEASLEY, OF COLUMBIA, MISSISSIPPI.

LOG-CART.

1,182,275.  Specification of Letters Patent.  Patented May 9, 1916.

Application filed October 7, 1914. Serial No. 865,561.

*To all whom it may concern:*

Be it known that we, WILLIAM F. HUTSON and JAMES C. BEASLEY, citizens of the United States, residing, respectively, at Barto, Pike county, Mississippi, and Columbia, Marion county, Mississippi, have invented certain new and useful Improvements in Log-Carts; and we do hereby declare the following to be a full, clear, and exact description of the invention, such as will enable others skilled in the art to which it appertains to make and use the same.

This invention relates to log carts and has special reference to a log cart designed to raise one end of a pile of logs or a single log off the ground so that it may be drawn along by a suitable team of draft animals.

The principal object of the invention is to improve the general construction of devices of this character.

A second object of the invention is to provide a log cart so arranged that draft upon the pole of the cart may, if desired, be used to effect the raising of the logs.

Another object of the invention is to provide a simple and efficient means for simultaneously releasing the shaft of the hoisting drum and operatively disconnecting the pole from the hoisting mechanism.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and:—Figure 1 is a side elevation of a log cart embodying the present invention. Fig. 2 is a top plan view of what is shown in Fig. 1. Fig. 3 is a front view of the device. Fig. 4 is a longitudinal section taken on the line 4—4 of Fig. 2. Fig. 5 is a similar section taken on the line 5—5 of Fig. 2. Fig. 6 is an enlarged transverse section on the line 6—6 of Fig. 2.

In the present embodiment of the invention there is provided a bolster 10 which carries the axle 11, said axle serving in turn to support the ground wheels 12. This bolster 10 has secured to the upper side thereof a sand bar 13 and the sand bar and bolster are provided with oppositely disposed notches 14 wherethrough slides a tongue or pole 15. To the sand bar and bolster are connected the hounds 16 and these hounds carry at their forward end a box 17 through which the tongue 15 slides. In order to limit the sliding movement of this tongue there is provided a suitable bolt 18 so that when this bolt is inserted in one of the holes 19 the movement forward of the tongue is limited. The tongue carries at its forward end the usual clevis 20 and at its rear end there is provided a bracket 21 wherethrough passes a bolt 22 having at its forward end an eye 23 and carrying on its rearward end a nut 24, the eye being forward of the bracket and the nut to the rear thereof. The purpose of this adjusting bolt and bracket will be hereinafter set forth.

Connecting the hounds 16 is a cross bar 25 and mounted on the cross bar 25 and sand bar 13 are the frame sides 26. Journaled in these frame sides is a shaft 27 which forms the driving shaft for the device. On this shaft 26 is securely keyed or otherwise fixed a gear 28 which has formed on one face thereof a clutch member 29. Splined on the shaft 27 is a second clutch member 30 in the form of an elongated sleeve. This second clutch member is provided with the usual shipper groove 31 and fitted in this groove 31 is the shipper ring 32. This ring 32 is provided with the trunnion 33 which engages in the sides of a double lever 34. This lever 34 is secured pivotally at its lower end to a bracket 35 mounted on the framework of the device and at its upper end this lever 34 is furthermore provided with an arm 36 which is pivoted to the upper end of the lever and extends through a suitable hole in one of the frame sides 26. The arrangement is such that by pushing upon the lever the clutch member is disengaged. Fixed upon the long sleeve 30 forming the second clutch member is a drum 37 and around this drum is wound a wire or cable 38 one end of which is attached to the eye 23 while the remaining end is secured to an eye bolt 39 on the forward part of the tongue. Between the drum 37 and the remaining frame side is a spring 40 which constantly urges the clutch members together so that if the lever 34 is released and free to move the clutch members will engage. Journaled in the frame sides 26 is a hoisting drum shaft 41 whereon is mounted a hoisting drum 42. This drum is hollow and fixed in the drum are certain eye bolts 43, the nuts for these bolts being applied through suitable openings left in the head of the drum. To these eye bolts 43 are attached the draft chains 44 which are provided with the usual draft hooks. Fixed upon the shaft 41 is a gear 45 which meshes with the gear 28 and formed on one side of this gear is a ratchet 46. Pivoted to one of the frame sides is a pawl 47 which is provided with a tail 48 projecting above said frame.

Journaled in a suitable bearing 49 is a rock shaft 50 which is provided at one end with an operating lever 51. On the other end of this rock shaft is an arm 52 which projects upward in such position as to engage the end of the arm 36 when the lever is moved in one direction. There is also provided on this rock shaft a bent arm 53 which is arranged to project over the side of the frame when the lever 51 is moved in one direction, said arm 53 engaging with the tail 48 of the pawl so as to raise the latter off of the ratchet. These parts are so proportioned that the release of the pawl from its ratchet takes place just after the two clutch members have been disengaged by the arm 36 being forced inward through the action of the arm 52.

In order to understand the operation of this device let it be supposed that the parts are in the position shown in the drawing. Now if the stop pin or bolt 18 be removed and the chains hitched around a log, draft animals having been attached to the tongue, then if the animals pull forward the wire causes rotation of the drum 37. If at this time the controlling lever 51 is in such position as to permit engagement of the clutch members then rotation of the drum will cause rotation of the hoisting drum through the action of the gearing. When the logs have been raised to the proper degree the draft animals are backed up. Now the pawl engaging the ratchet prevents unwinding of the hoisting drum while the spring permits reversal of movement of the controlling drum since the clutch members are so formed as to automatically release when backward movement of the shaft takes place. When the tongue has been restored to its proper position the bolt 18 is replaced and the load of logs driven to the place of deposit. Then the operator takes the controlling lever and moves it in such direction as to simultaneously unclutch the clutch members and release the hoisting drum shaft. Thereupon the hoisting drum revolves freely and drops the load. When the load has been dropped the chains of course are unhitched and the cart is again ready for taking up a second load. There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention, what is claimed as new, is:—

1. In a log cart, a frame, wheels supporting said frame, a tongue slidable in said frame, a hoisting drum, an operative connection between the tongue and drum including a clutch, means to lock said drum against unwinding independently of the movement of the tongue, and means to open the clutch and free said drum from the locking means in succession.

2. In a log cart, a wheel supported frame, a tongue slidable in said frame, a shaft journaled in said frame and having a drum splined thereto, a cable wound around the drum and connected to the tongue, a clutch member attached to the drum, a gear revoluble on said shaft and having a clutch member connected thereto to coöperate with the first clutch member, a hoisting drum shaft having gear connection with the gear on the first shaft, a ratchet on the hoisting drum shaft, a pawl engaging said ratchet, a shipper lever controlling the clutch, and means for successively operating the shipper lever and releasing the pawl.

3. In a log cart, a wheel supported frame, a tongue slidable in said frame, a shaft journaled in said frame and having a drum splined thereto, a cable wound around the drum and connected to the tongue, a clutch member attached to the drum, a gear revoluble on said shaft and having a clutch member connected thereto to coöperate with the first clutch member, a hoisting drum shaft having gear connection with the gear on the first shaft, a ratchet on the hoisting drum shaft, a pawl engaging said ratchet, a shipper lever controlling the clutch, a rock shaft, means for rotating the rock shaft and arms on said shaft arranged to operate the shipper lever and free the pawl successively.

In testimony whereof, we affix our signatures, in the presence of witnesses.

WILLIAM F. HUTSON.
JAMES C. BEASLEY.

Witnesses:
X. O. STEELE,
F. M. GREAVES,
C. G. HAPGOOD,
A. W. PIGOTT.